(12) United States Patent
Sakurai et al.

(10) Patent No.: US 8,077,165 B2
(45) Date of Patent: Dec. 13, 2011

(54) OPERATION DEVICE, ELECTRONIC BOOK DEVICE AND ELECTRONIC APPARATUS

(75) Inventors: Satoshi Sakurai, Shinagawa (JP); Nobuo Yatsu, Shinagawa (JP); Shinichiro Akieda, Shinagawa (JP); Takuya Uchiyama, Shinagawa (JP); Keita Harada, Shinagawa (JP); Takashi Arita, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 940 days.

(21) Appl. No.: 11/497,289

(22) Filed: Aug. 2, 2006

(65) Prior Publication Data

US 2007/0033541 A1 Feb. 8, 2007

(30) Foreign Application Priority Data

Aug. 4, 2005 (JP) .................. 2005-226186

(51) Int. Cl.
  *G06F 3/033* (2006.01)
(52) U.S. Cl. ..................... 345/184; 340/407.2
(58) Field of Classification Search .................. 345/901, 345/156–184; 340/407.1–407.2; 116/205
See application file for complete search history.

(56) References Cited

U.S. PATENT DOCUMENTS

| | | | | |
|---|---|---|---|---|
| 4,324,958 A * | 4/1982 | Valleau | ........................ | 200/16 F |
| 6,128,006 A * | 10/2000 | Rosenberg et al. | ............ | 345/163 |
| 6,429,846 B2 * | 8/2002 | Rosenberg et al. | ............ | 345/156 |
| 6,747,631 B1 | 6/2004 | Sakamaki et al. | | |
| 2001/0032776 A1 * | 10/2001 | Gotoh | ............................ | 200/6 A |
| 2002/0045151 A1 * | 4/2002 | Roberts et al. | ................. | 434/113 |
| 2003/0034954 A1 * | 2/2003 | Sakamaki et al. | ............. | 345/156 |
| 2003/0080939 A1 * | 5/2003 | Kobayashi | ..................... | 345/156 |
| 2003/0214375 A1 | 11/2003 | Sugano et al. | | |
| 2004/0100440 A1 * | 5/2004 | Levin et al. | .................... | 345/156 |
| 2004/0110562 A1 * | 6/2004 | Kajino et al. | .................... | 463/36 |
| 2004/0212587 A1 * | 10/2004 | Kong | ............................. | 345/156 |
| 2004/0212602 A1 * | 10/2004 | Nako et al. | ...................... | 345/173 |
| 2004/0252104 A1 * | 12/2004 | Nakamura et al. | ............. | 345/160 |
| 2005/0024327 A1 * | 2/2005 | Hagiwara et al. | .............. | 345/156 |
| 2005/0052425 A1 * | 3/2005 | Zadesky et al. | ................ | 345/173 |

FOREIGN PATENT DOCUMENTS

| | | |
|---|---|---|
| JP | 8249344 | 9/1996 |
| JP | 11-312041 | 11/1999 |
| JP | 2000123678 | 4/2000 |
| JP | 2000173397 | 6/2000 |
| JP | 2000-330688 | 11/2000 |
| JP | 2003-331674 | 11/2003 |
| JP | 2005-004365 | 1/2005 |
| JP | 2005-010729 | 1/2005 |
| WO | WO 03/023754 | 3/2003 |

OTHER PUBLICATIONS

Patent Abstracts of Japan, Publication No. 2003-331674, published Nov. 21, 2003.

(Continued)

*Primary Examiner* — Chanh Nguyen
*Assistant Examiner* — Allison Walthall
(74) *Attorney, Agent, or Firm* — Staas & Halsey LLP

(57) ABSTRACT

An operation device includes: an operated body; an operation signal producing part that produces an operation signal based on an operation on the operated body; and a tactile information presenting part that presents tactile information through the operated body. The operation device may be applied to an electronic book device for flipping of pages.

13 Claims, 17 Drawing Sheets

OTHER PUBLICATIONS

Patent Abstracts of Japan, Publication No. 2000-330688, published Nov. 30, 2000.
Patent Abstracts of Japan, Publication No. 2005-010729, published Jan. 13, 2005.
Patent Abstracts of Japan, Publication No. 11-312041, published Nov. 9, 1999.
Japanese Patent Office Action dated Novemebr 16, 2010 in application No. 2005-226186.
Japanese Office Action mailed Jun. 8, 2010 for corresponding Japanese patent application 2005-226186.

* cited by examiner

OPERATION DEVICE, ELECTRONIC BOOK DEVICE AND ELECTRONIC APPARATUS

BACKGROUND OF THE INVENTION

1. Field of the Invention

This invention generally relates to an operation device capable of forming an operation signal to an electronic apparatus in response to an operation by an operator and visually presenting a variety of information to the operator. Further, the present invention relates to an electronic book device equipped with the operation device and an electronic apparatus equipped therewith.

2. Description of the Related Art

The electronic book device is portable and is capable of displaying book data stored in a memory on a screen (see, Japanese Patent Application Publication No. 8-249344: hereinafter referred to as Document 1).

A given button or the like provided in the electronic book device is operated to flip pages of the electronic book. It is required to visually recognize, from page information displayed on the screen, whether pages has actually been flipped or at which position the current page displayed is located in the whole book. In the real book, it is possible to recognize the actual flipping of pages or the current position through tactile sense of a hand or fingers that hold or touch the book.

The device disclosed in Document 1 is equipped with a vibrator, which is vibrated at a frequency dependent on the current page position in-the whole book. The vibration thus generated is presented to the operator through the operator's tactile sense.

However, the device disclosed in Document 1 is separately equipped with the operation button and the vibrator. Thus, the operator cannot be given vibration unless the operator actually grips the electronic book device by hand and manipulates the operation button. Further, it is difficult to reliably recognize tactile information dependent on the operator's operation because vibration is not directly transferred to the end of the finger through which the operation button is operated.

SUMMARY OF THE INVENTION

The present invention has been made in view of the above circumstances, and provides an operation device capable of reliably presenting tactile information based on an operator's operation to the end of finger.

According to an aspect an exemplary embodiment, there is provided an operation device including: an operated body; an operation signal producing part that produces an operation signal based on an operation on the operated body; and a tactile information presenting part that presents tactile information through the operated body.

According to another aspect of an exemplary embodiment, there is provided an electronic book device including: a display; a memory that stores book data to be displayed on the display; an operation device instructing flipping of pages of the book data; and a processor controlling the display, the memory and the operation device, the operation device including: an operated body operated at the time of flipping of pages; an operation signal producing part that produces an operation signal based on flipping of pages on the operated body; and a tactile information presenting part that presents tactile information through the operated body, the tactile information being based on flipping of pages.

According to another aspect of an exemplary embodiment, there is provided an electronic device including: a processor; and an operation device connected to the processor, the operation device including: an operated body; an operation signal producing part that produces an operation signal based on an operation on the operated body, the operation signal being sent to the processor; and a tactile information presenting part that presents tactile information through the operated body under the control of the processor.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of embodiments of the present invention.

Figure 1:
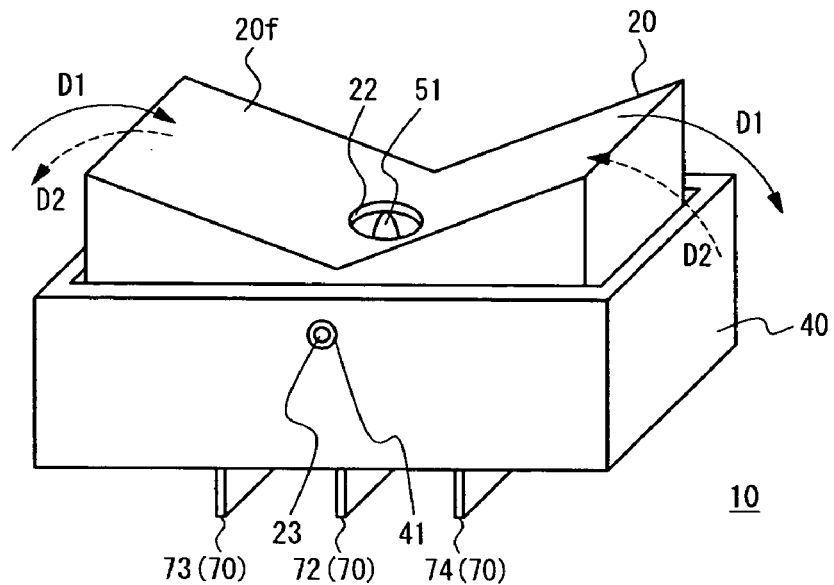
FIG. 1 is a perspective view of an operation device in accordance with a first embodiment.
Figure 2:
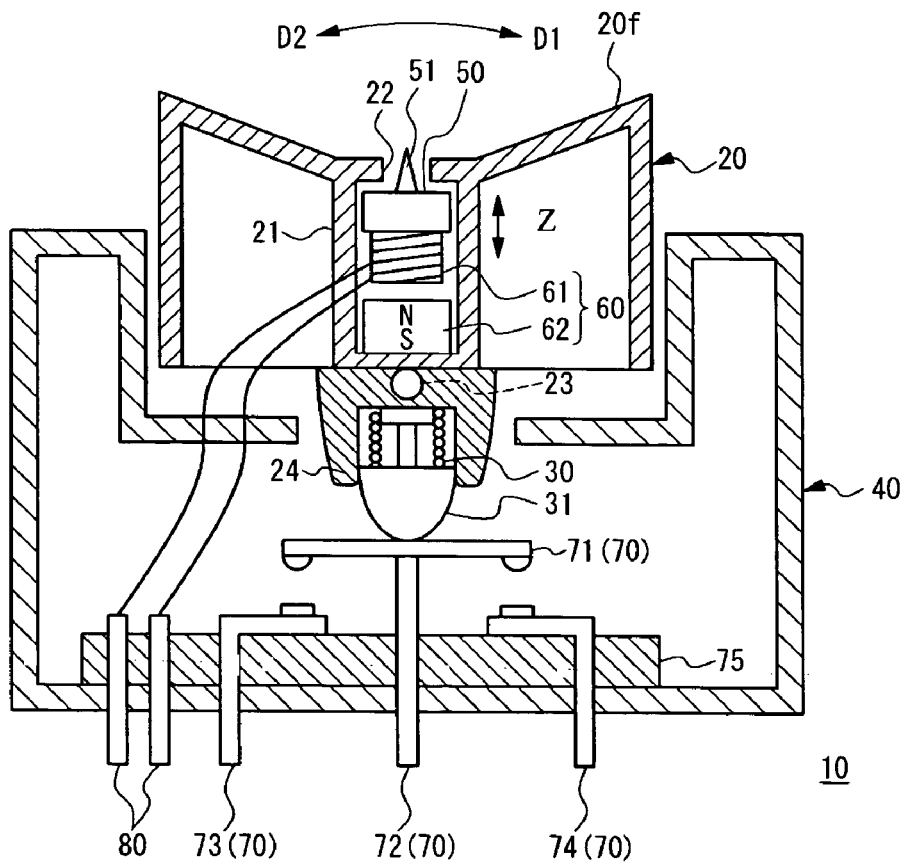
FIG. 2 is a cross-sectional view of the operation device shown in FIG. 1.
Figure 3:
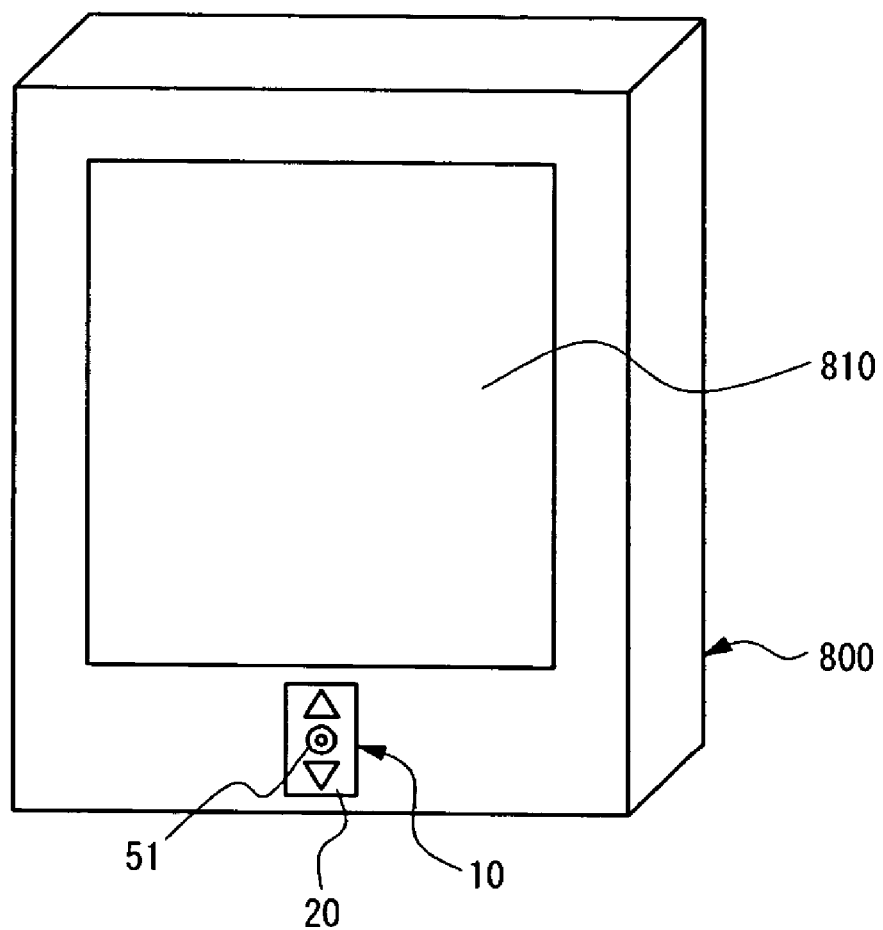
FIG. 3 is a perspective view of an electronic book device that is an example of an electronic apparatus to which the operation device is applied.
Figure 4:
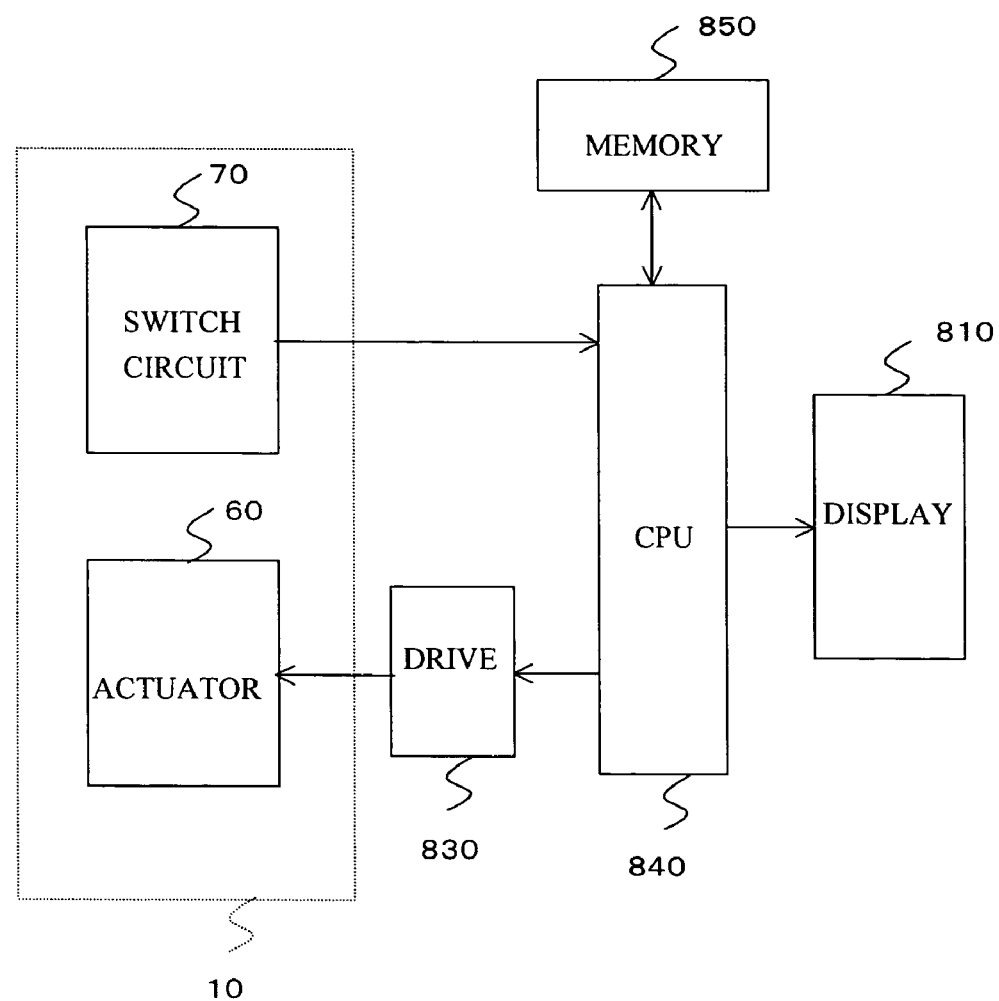
FIG. 4 is a block diagram of the electronic book device shown in FIG. 3.
Figure 5:
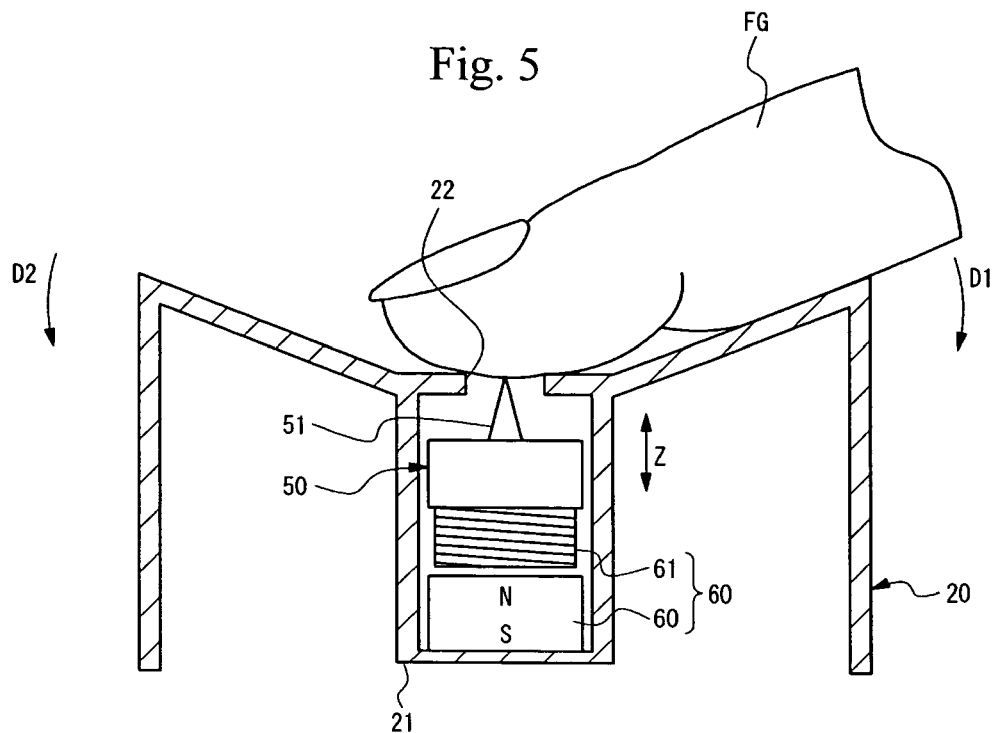
FIG. 5 is a cross-sectional view of the operation device of FIG. 1 that illustrates functions thereof.

FIGS. 1 through 5 show a first embodiment of the present invention. More particularly, FIG. 1 is a perspective view of an operation device in accordance with the first embodiment, and FIG. 2 is a cross-sectional view of the operation device. FIG. 3 is a perspective view of an electronic book device that is an example of an electronic apparatus to which the operation device is applied, and FIG. 4 is a block diagram of the electronic book device. FIG. 5 is a cross-sectional view of the operation device that illustrates functions thereof.

Referring to FIGS. 1 and 2, an operation device 10 includes an operated body 20, a casing 40, a touch member 50, an actuator 60, and a switch circuit 70. The operated body 20 is operated by an operating member such as a finger of the operator. The casing 40 supports the operated body 20 in such a manner that the operated body 20 swings freely. The actuator 60 functions as a driver or driving means for moving the touch member 50. The switch circuit 70 functions as operation signal producing means. The operation device 10 may be a seesaw switch. The actuator 60 and the touch member 50 forms tactile information presenting means.

The operated body 20 may be made of a resin material, and has a holding section 21, an opening 22, a support shaft 23, and a receiving section 24. The holding section 21 is formed in the center of the operated body 20 and accommodates the touch member 50 and the actuator 60. The opening 22 is formed on a concavely curved upper surface (front surface) 20f of the operated body. The shaft 23 serves as a given axis for swinging and protrudes from the opposing sides of the operated body 20. The operated body 20 is supported so that the shaft 23 is inserted into support holes 40 formed in the casing 40. This mechanism allow the operated body 20 to freely swing in swing directions D1 and D2.

The touch member 50 may be made of a resin material, and is accommodated and guided in the holding section 21 so that the touch member 50 can freely move in directions Z. The touch member 50 has a protrusion 51, which may protrude from the opening 22 and is touchable to a finger of the operator placed on the upper surface 20f.

As shown in FIGS. 1 and 2, the actuator 60 may be an electromagnetic actuator that includes a coil 61 and a magnet 62. The coil 61 is fixed to the lower surface of the touch member 50 and is positioned so as to face the magnet 62. The magnet 62 is fixed to the bottom of the holding section 21. The actuator 60 thus configured is fixed to a substrate 75 provided in the casing 40, and is supplied with electricity via coil terminals 80, which partially project from the casing 40 in order to make external electrical connections. A force dependent on the voltage applying direction is exerted between the coil 61 and the magnet 62, and vibrates (moves) the touch member 50 in the directions Z. Instead of the structure shown in FIG. 2, the coil 61 may be fixed to the holding section 21 and the magnet 62 can move.

The switch circuit 70 includes a movable terminal 71, a common terminal 72 and stationary terminals 73 and 74, these terminals being made of an electrically conductive substance. The switch circuit 70 produces a switching signal based on the operation of the operated body 20.

The movable terminal 71 has a flexibility, and is electrically connected to the common terminal 72. The movable terminal 71 includes a beam and is pressed by a press member 31. As shown in FIG. 2, the press member 31 is disposed to the receiving section 24 of the operated body 20, and is urged towards the movable terminal 71 by a spring 30. The operated body 20 is operated to make the press member 31 inclined in an either direction about the support shaft 23, the inclined press member 31 depresses an either side of the movable terminal 71, which may be deformed. The common terminal 72 is fixed to the substrate 75 and partially protrudes from the casing 40 for an external electrical connection. The stationary terminals 73 and 74 are fixed to the substrate 75 so as to face both sides of the movable terminal 71, and partially protrude from the casing 40 for external electrical connections.

Referring to FIG. 2, when the operated body 20 is operated to swing in the swing direction D1, the press member 31 depresses the corresponding side of the movable terminal 71 and makes the electrical connection between the movable terminal 71 and the stationary terminal 73. When the operated body 20 is operated to swing the swing direction D2, the press member 31 depresses the corresponding side of the movable terminal 71 and makes the electrical connection between the movable terminal 71 and the stationary terminal 74. In this manner, the switch circuit 70 changes the connecting state in accordance with the swing direction of the operated body 20, and produces the switching signal based on the connecting state.

Referring to FIG. 3, an electronic book device 800 has a display 810, which may be a liquid crystal display on which electronic book data is displayed. The operation device 10 is attached to the front surface of the electronic book device 800, and is used for flipping of pages of the electronic book. Further, as shown in FIG. 4, the electronic book device 800 is equipped with a drive circuit 830, a processor (which may be a CPU) 840 and a memory 850 in addition to the display 810 and the operation device 10. The drive circuit 830 drives the actuator 60 in response to a control instruction from the CPU 840. The memory 850 stores electronic book data to be displayed and control programs.

The CPU 840 totally controls the electronic book device 800. For example, the CPU 840 executes a given control program to display electronic book data on the display 810. The CPU 840 is connected to the switch circuit 70 and the drive circuit 830, and controls forwarding and reversing of pages of the electronic book data displayed on the screen 810 in response to the switching signal produced by the switch circuit 70 based on the user's operation on the operation device 10. Further, the CPU 840 controls the actuator 60 in accordance with forwarding and reversing of pages in order to present tactile information based on the page forwarding/reversing operation to the finger of the operator who operates the operated body 20.

An exemplary page forwarding and reversing by the operator will now be described.

Referring to FIG. 5, the swing direction D1 of the operated body 20 of the operation device 10 is defined as a page forwarding direction, and the swing direction D2 is defined as a page reversing direction. The operator places his/her finger FG on the upper surface 20f of the operated body 20 of the operation device 10, and operates the operated body 20 in the page forwarding direction D1 or the page reversing direction D2. Thus, flipping of pages on the electronic book displayed on the display 810 can be realized.

The CPU 840 of the electronic book device 800 refers to the switching signal produced by the switch circuit 70 and thus recognizes the page flipping direction based on the swing operation of the operated body 20. Then, the CPU 840 drives the actuator 60 each time flipping of pages is carried out to move up and down the touch member 50. During the vibration of the touch member 50, the protrusion 51 attached to the top of the touch member 50 repetitively hits the finger FG through the opening 22. Thus, the operator recognizes flipping of pages through tactile sense.

Figure 6:
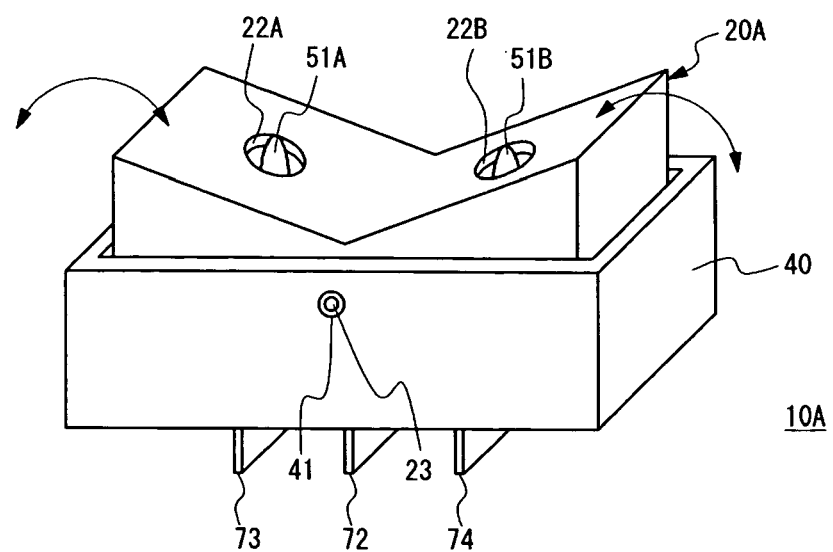
FIG. 6 is a perspective view of a variation of the first embodiment.
Figure 7:
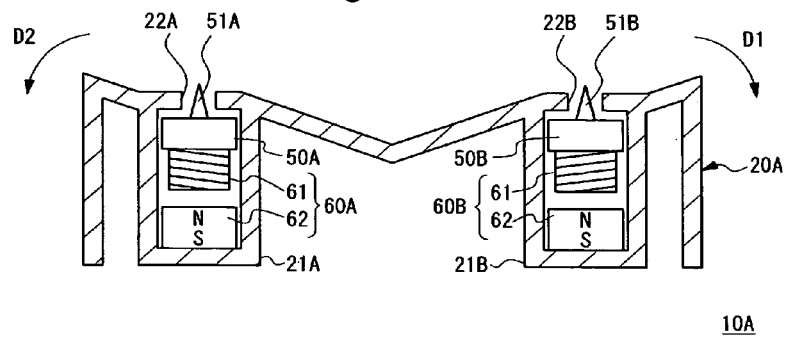
FIG. 7 is a cross-sectional view of the variation shown in FIG. 6.
Figure 8:
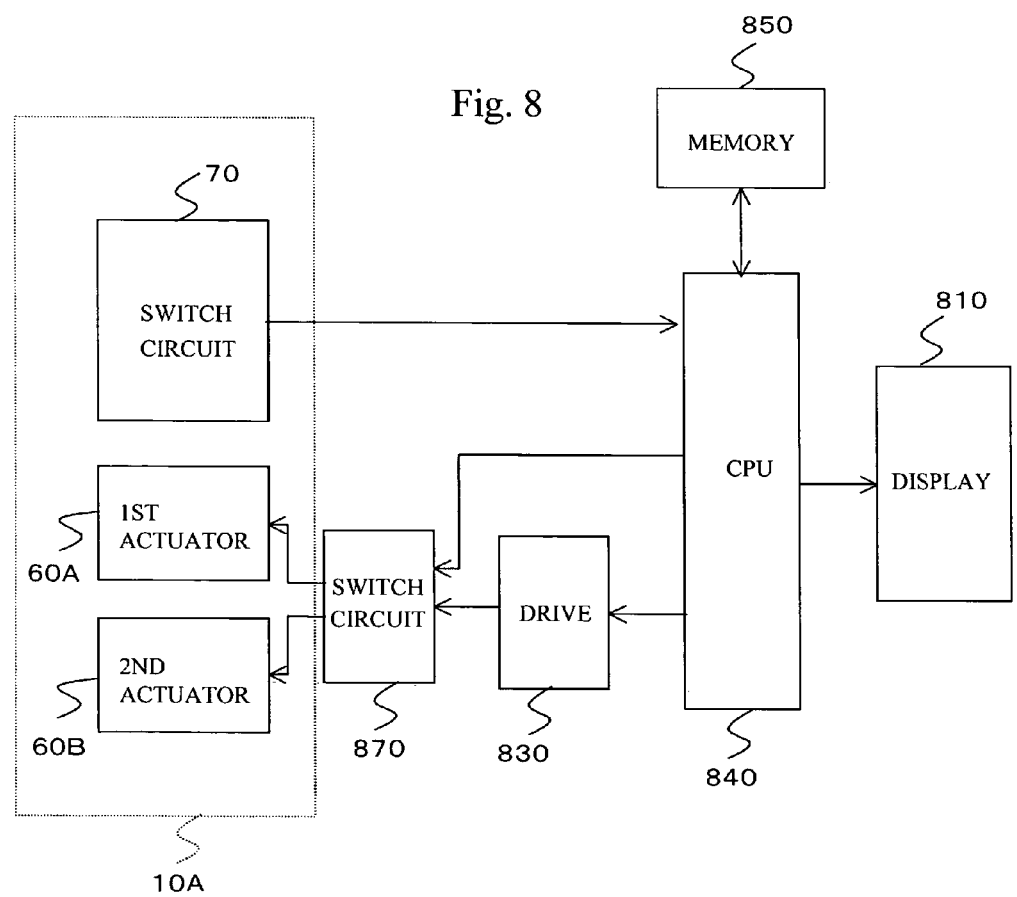
FIG. 8 is a block diagram of an electronic book device to which the variation is applied.

FIGS. 6, 7 and 8 show a variation of the operation device of the first embodiment. More particularly, FIG. 6 is a perspective view of the variation, FIG. 7 is a cross-sectional view thereof, and FIG. 8 is a block diagram of an electronic book device to which the variation is applied. In FIGS. 6 through 8, parts that are the same as those shown in the previously described figures are given the same reference numerals.

An operation device 10A shown in FIGS. 6 through 8 has an operated body 20A having multiple holding sections 21A and 21B (two sections in the present embodiment). In the holding section 21A, there are accommodated a touch member 50A and a first actuator 60A. Similarly, a touch member 50B and a second actuator 60B are accommodated in the holding section 21B. Two openings 22A and 22B are formed in the upper (front) surface 20f of the operated body 20A. The two touch members 50A and 50B have protrusions 51A and 51B, which protrude from the upper surface 20f through the openings 22A and 22B, respectively. The touch member 50A and the first actuator 60A are associated with one of the page forwarding and reversing operations, and the touch member 50B and the second actuator 60B are associated with the other operation. The other structures of the operation device 10A are the same as corresponding those of the operation device 10.

Referring to FIG. 8, the electronic book device equipped with the operation device 10A has a switch circuit 870 provided between the first and second actuators 60A and 60B and the drive circuit 830 that drives these actuators. The switch circuit 870 receives an instruction from the CPU 840 based on the page flipping direction, and selects either the first actuator 60A or the second actuator 60B to be driven by the drive circuit 830. More specifically, when the operated body 20A is operated in the page forwarding direction D1, the switch circuit 870 selects the second actuator 60B. When the operated body 20A is operated in the page reversing direction D2, the switch circuit 870 selects the first actuator 60A.

The above structure is separately provided with the touch member 50B to be driven at the time of page forwarding and the touch member 50A to be driven at the time of page reversing. Thus, the operator places his/her finger on the opening 51B when forwarding pages, and on the opening 51A when reversing pages. In addition, the operator can receive tactile information by the protrusion 51A or 51B on the basis of the page flipping direction. Thus, the operationality can be improved.

Figure 9:
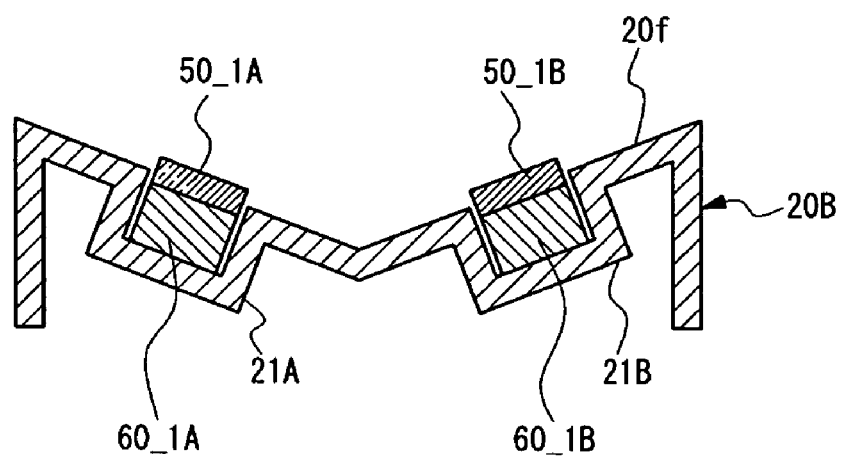
FIG. 9 is a cross-sectional view of another variation of the operation device of the first embodiment.

FIG. 9 is a cross-sectional view of another variation of the operation device of the first embodiment. An operation device shown in FIG. 9 has an operated body 20B having two holding sections 21A and 21B, in which two piezoelectric elements 60-1A and 60-1B serving as driving means are held, respectively. Film-like touch members 50-1A and 50-1B are respectively fixed to the piezoelectric elements 60-1A and 60-1B, and are exposed from the upper (front) surface 20f of the operated body 20B.

Voltages are applied to the piezoelectric elements 60-1A and 60-1B, which are thus vibrated. Therefore, the operation device shown in FIG. 9 has functions and effects similar to those of the operation device shown in FIGS. 6 through 8, and may be miniaturized and integrated.

Figure 10:
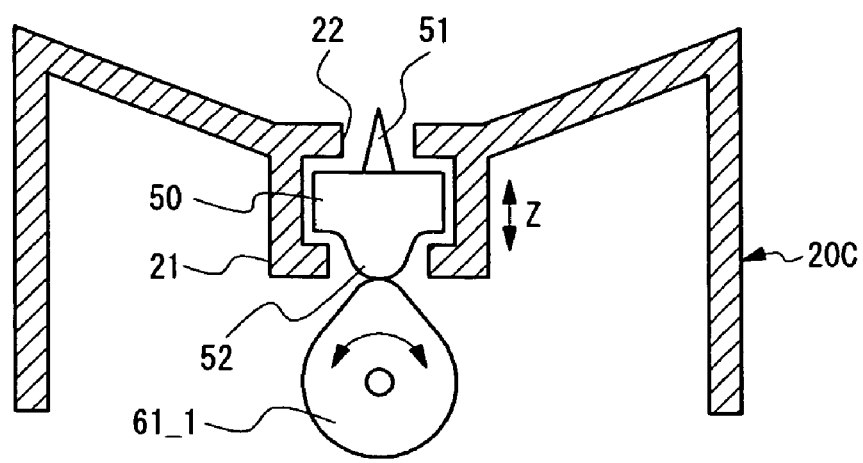
FIG. 10 is a cross-sectional view of yet another variation of the operation device of the first embodiment.
Figure 11:
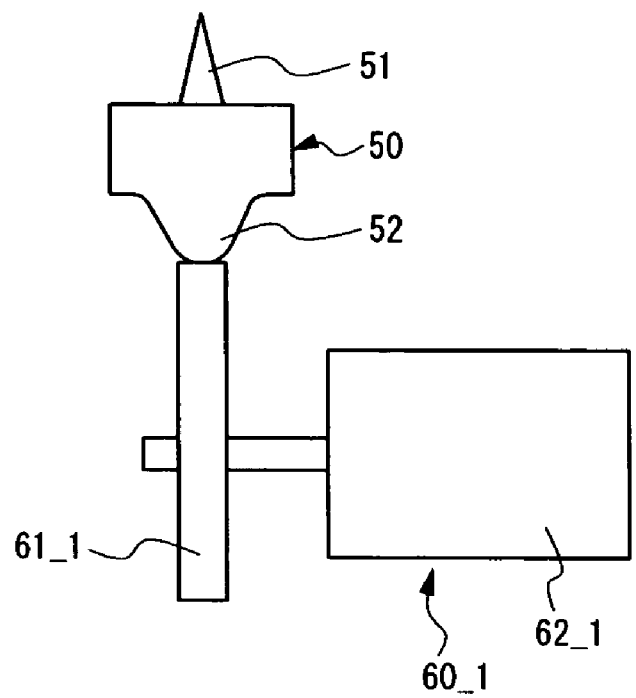
FIG. 11 is a cross-sectional view of the variation shown in FIG. 10.

FIGS. 10 and 11 show yet another variation of the operation device of the first embodiment, in which FIG. 10 is a cross-sectional view of this variation, and FIG. 11 shows a driving mechanism serving as a driving means. An engagement portion 52 is formed in the touch member 50 of the present operation device accommodated in the holding section 21 of the operated body 20. A driving mechanism 60-1 has a cam member 61-1, and a motor 62-1. The cam member 61-1 is disposed so as to engage the engagement portion 52. The motor 62-1 rotates the cam member 61-1. The driving mechanism 60-1 is used in the casing 40, which is not illustrated in FIGS. 10 and 11. The motor 62-1 rotates to bring the cam member 61-1 into contact with the touch member 50, which is moved up and down. During the up and down movement, the protrusion 51 is repetitively caused to protrude from the operated body 20 through the opening 22.

Figure 12:
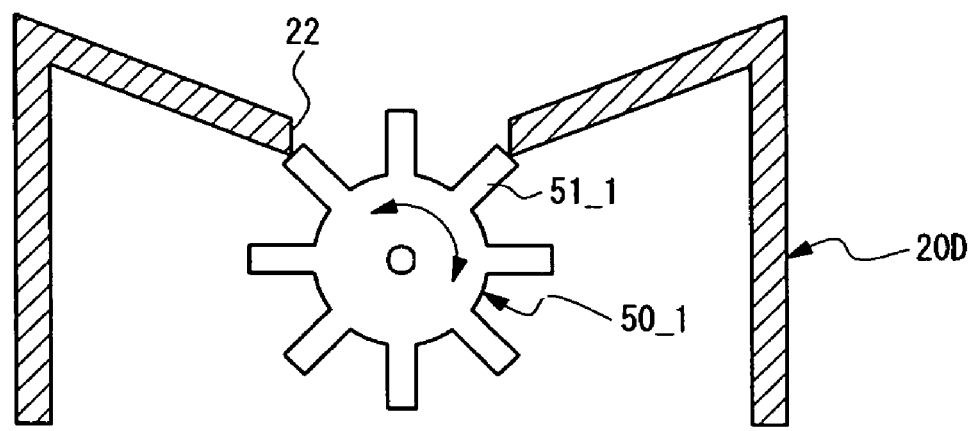
FIG. 12 is a cross-sectional view of a further variation of the operation device of the first embodiment.
Figure 13:
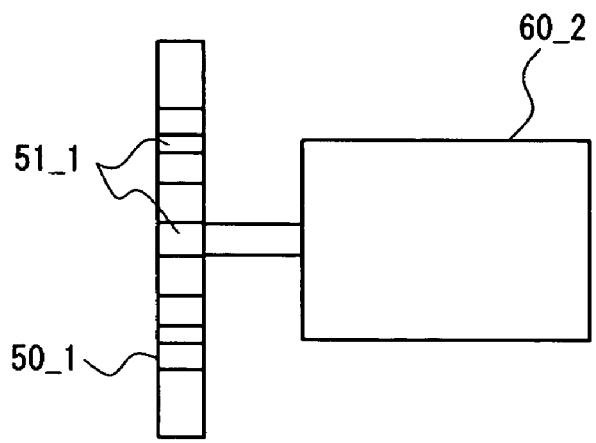
FIG. 13 shows a driver employed in the variation shown in FIG. 12.

FIGS. 12 and 13 show a further variation of the operation device of the first embodiment. FIG. 12 is a cross-sectional view of the present variation, and FIG. 13 shows a driver or driving means. A touch member 50-1 has a bladed wheel shape having blades 51-1, which may be exposed through the opening 22 so as to protrude from an operated body 20D. The touch member 50-1 may be driven by a motor 60-2 serving as a driving means. The touch member 50-1 rotates, and the blades 51-1 are exposed from the opening 22 in turn and touch the finger. Thus, the operator may recognize tactile information. The rotating direction of the touch member 50-1 may be changed in accordance with the page flipping direction. Thus, the operator may receive different tactile information in page forwarding and reversing.

Figure 14:
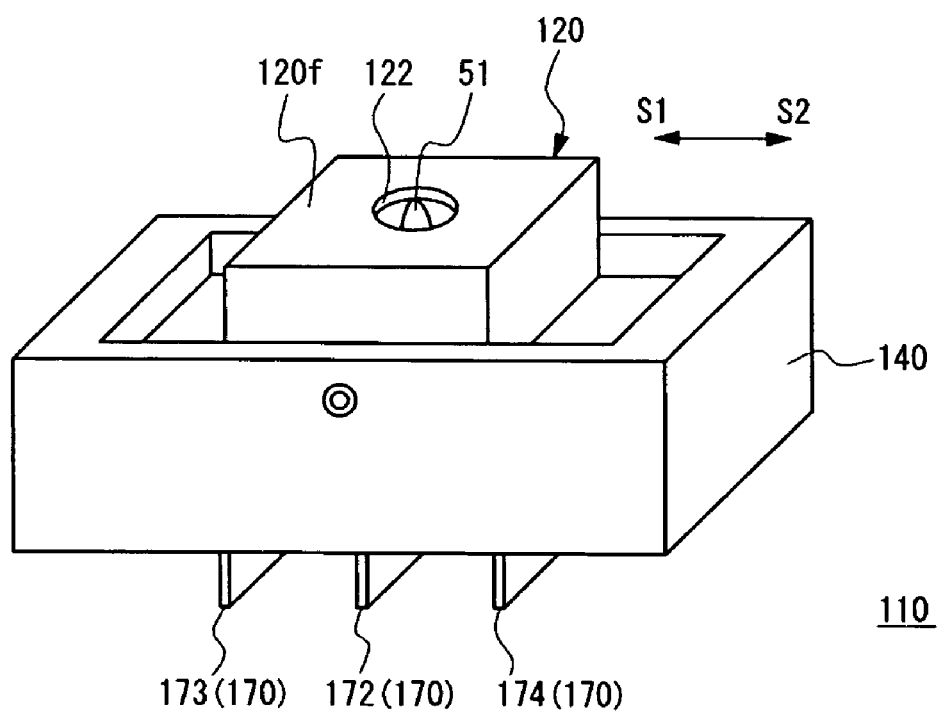
FIG. 14 is a perspective view of an operation device in accordance with a second embodiment of the present invention.
Figure 15:
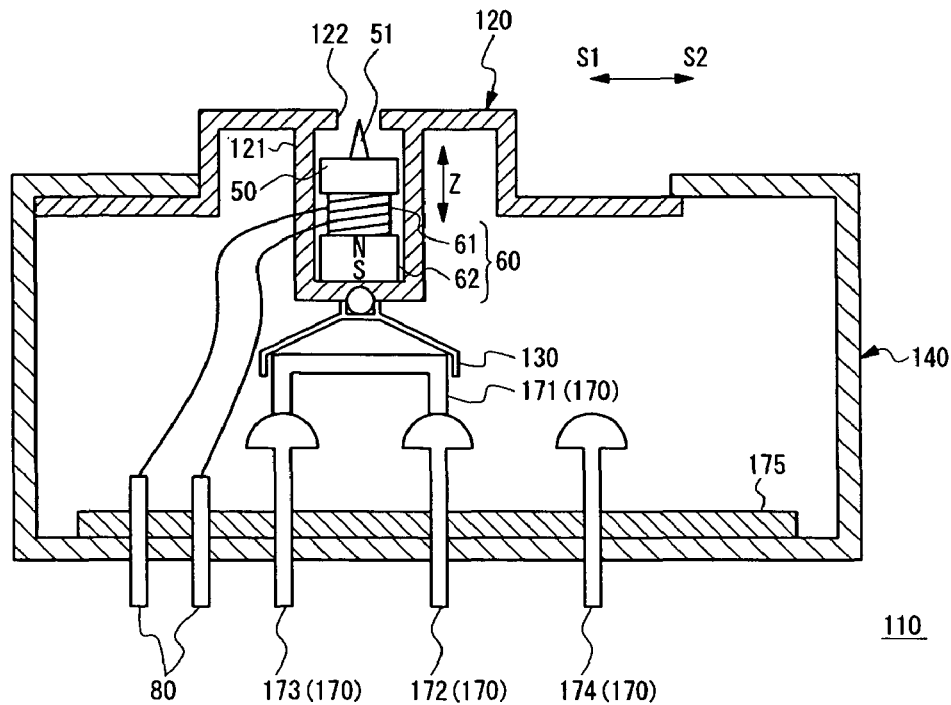
FIG. 15 is a cross-sectional view of the operation device shown in FIG. 14.

FIG. 14 is a perspective view of an operation device in accordance with a second embodiment of the present invention, and FIG. 15 is a cross-sectional view thereof. In FIGS. 14 and 15, parts that are the same as those of the first embodiment are given the same reference numerals.

Referring to FIGS. 14 and 15, an operation device 110 has an operated body 120, a casing 140 and a switch circuit 170 in addition to the touch member 50 and the actuator 60 for driving the touch member 50. The operated body 120 is operated by an operator's finger or the like. The casing 140 supports the operated body 120 so that it can freely slide in sliding directions S1 and S2. The switching circuit 170 functions as an operation signal producing means.

The operated body 120 is guided by a guide mechanism (not shown) so that it can freely slide in the sliding directions S1 and S2. The operated body 120 has a holding section 121 in which the touch body 50 and the actuator 60 are built. The touch member 50 has a protrusion 51, which may protrude from an upper (front) surface 120f of the operated body 120 through an opening 122 formed therein.

The switch circuit 170 is made up of a connection making member 171, a common terminal 172, and stationary terminals 173 and 174. The connection making member 171 is urged downwards by a spring member 130 attached to a lower end of the holding section 121 of the operated body 120. The common terminal 172 and the stationary terminals 173 and 174 are fixed to a substrate 175 and partially protrude from the casing 140 outwards. When the operator slides the operated body 120 of the switch circuit 170 in the sliding direction S1, the connection making member 171 connects the common terminal 172 to the stationary terminal 173. On the contrary, when the operator slides the operated body 120 in the sliding direction S2, the connection making member 171 connects the common terminal 172 to the stationary terminal 174. In this manner, the switch circuit 170 makes different connections in accordance with the sliding directions.

The operation device 110 thus structured may be applied to the electronic book device as in the case of the first embodiment, and provides similar functions and advantages.

Figure 16:
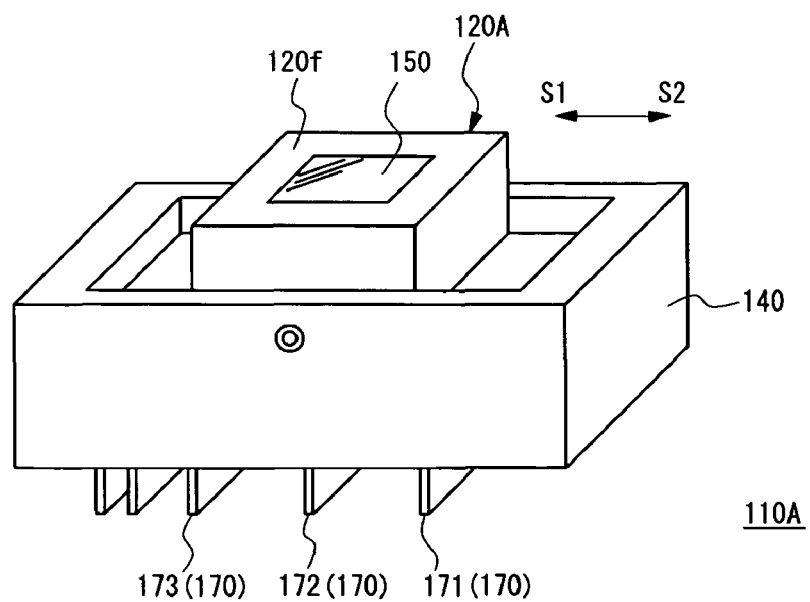
FIG. 16 is a perspective view of a variation of the operation device of the second embodiment.
Figure 17:
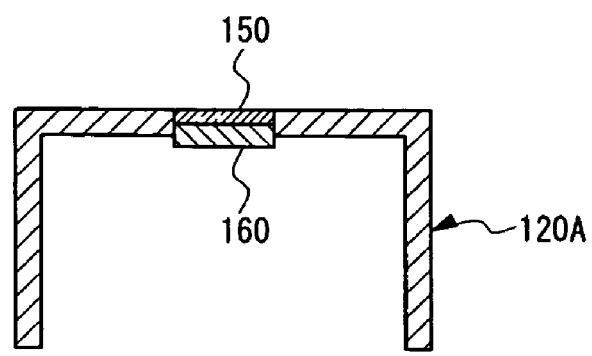
FIG. 17 is a cross-sectional view of an operated body employed in the variation shown in FIG. 16.

FIG. 16 is a perspective view of a variation of the operation device of the second embodiment, and FIG. 17 is a cross-sectional view of an operated body employed in this variation. In FIGS. 16 and 17, parts that are the same as those of the second embodiment are given the same reference numerals.

Referring to FIGS. 16 and 17, an operation device 110A has a touch member 150 and a piezoelectric element 160. The touch member 150 has a film-like member and is provided to the upper (front) surface 120$f$ of an operated body 120A so that the touch member 150 is exposed therefrom. The piezoelectric element 160, which serves as a driving means, is held by the operated body 120A and is fixed to the touch member 150. When a voltage is applied to the piezoelectric element 160, the film-like contact member 150 is vibrated. The operator who touches the touch member 150 can receive tactile information therefrom.

Figure 18:
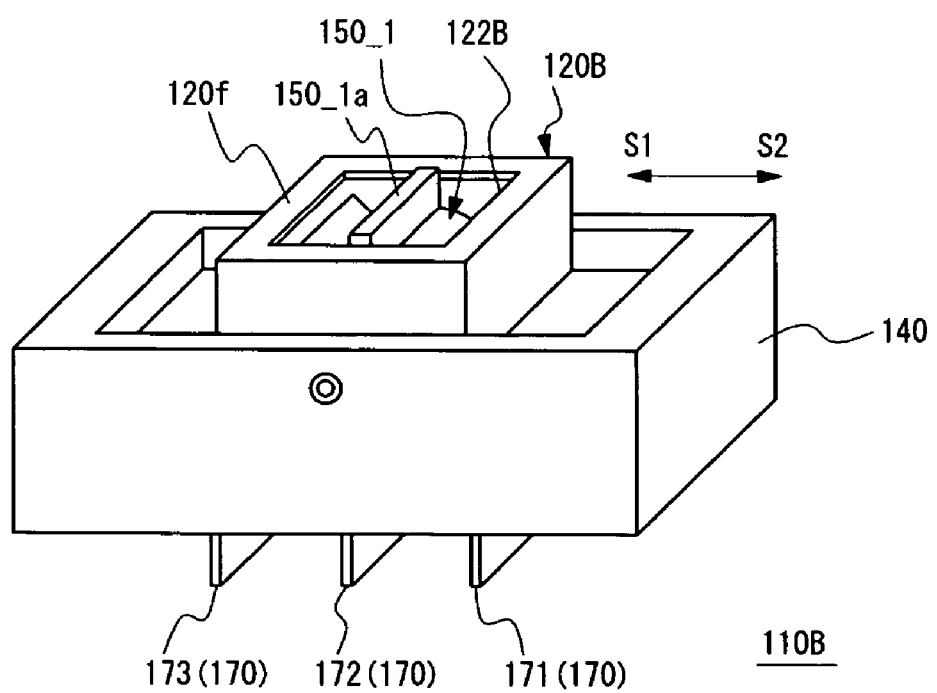
FIG. 18 is a perspective view of another variation of the operation device of the second embodiment.
Figure 19:
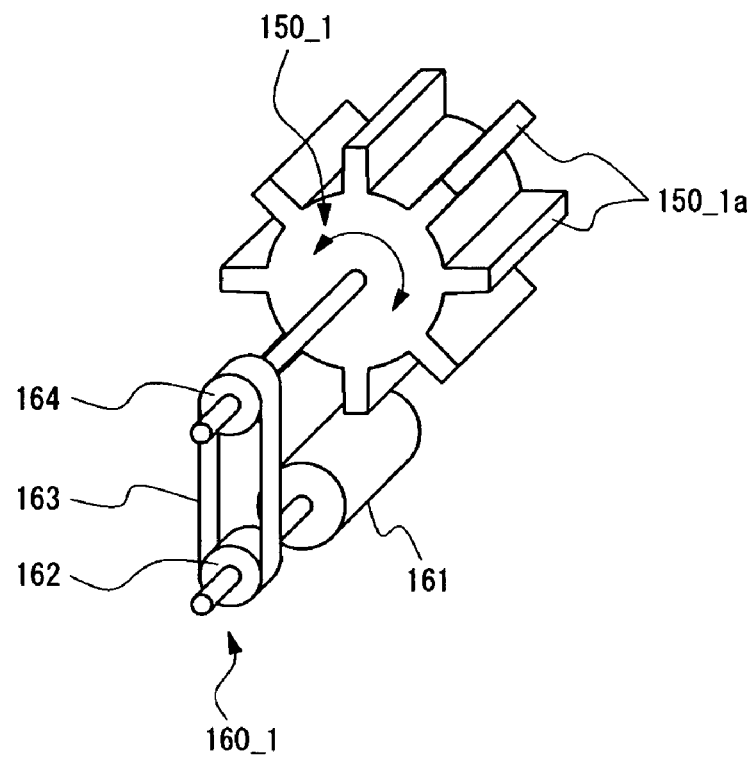
FIG. 19 is a perspective view of a touch member and a driver employed in the operation device shown in FIG. 18.

FIG. 18 is a perspective view of another variation of the operation device of the second embodiment, and FIG. 19 is a perspective view of a touch member and a driving means employed in the operation device shown in FIG. 18.

Referring to FIG. 18, an operation device 110B has a contact member 150-1 having a bladed wheel or a gear having blades, which are partially exposed from an opening 122B formed in the upper (front) surface 120$f$ of the operated body 120B. A driving mechanism 160-1 functions as means for driving the bladed wheel touch member 150-1, and includes a motor 161, a pulley 162, a pulley 164, and a belt 163. The pulley 162 is connected to the motor 161, and the pulley 164 is connected to the touch member 150-1 of the bladed wheel. The belt 163 is wound around the pulleys 162 and 164.

In operation of the operation device 110B, when the touch member 150-1 rotates, blades 150-1$a$ thereof touch the operator's finger in turn, so that the operator can recognize tactile information. The rotating direction of the touch member 150-1 may be changed in accordance with the page flipping direction. Thus, the operator may receive different tactile information in page forwarding and reversing.

Figure 20:
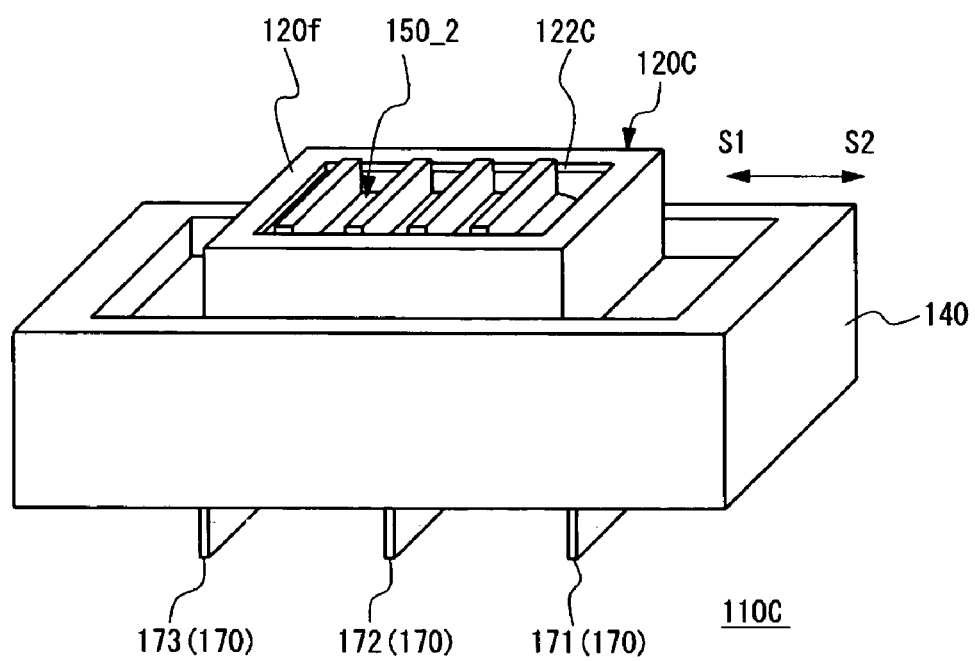
FIG. 20 is a perspective view of a further variation of the operation device of the second embodiment.
Figure 21:
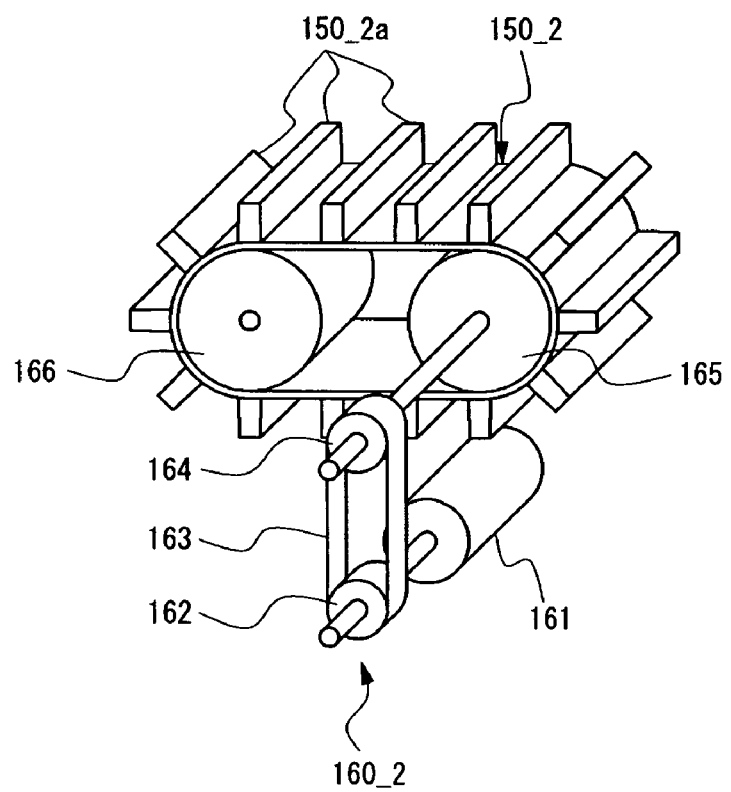
FIG. 21 is a perspective view of a touch member and a driver employed in the operation device shown in FIG. 20.

FIG. 20 is a perspective view of a further variation of the operation device of the second embodiment, and FIG. 21 is a perspective view of a touch member and a driving means employed in the operation device shown in FIG. 20.

Referring to these figures, an operation device 110C of the present variation has a touch member 150-2 that is an endless belt having protrusions 150-2$a$ arranged intermittently. The protrusions 150-2$a$ are partially exposed from an opening 122C formed in the upper (front) surface 120$f$ of the operated body 120C. A driving mechanism 160-2 functions as means for driving the endless belt type touch member 150-2, and is made up of a motor 161, pulleys 162 and 164, a belt 163, and pulleys 165 and 166, as shown in FIG. 21. The touch member 150-2 is wound around the pulleys 165 and 166.

When the motor 161 is rotated, the touch member 150-2 travels in the direction based on the rotating direction of the motor 161, and the protrusions 150-2$a$ touch the operator's finger. Thus, the operator can recognize tactile information. The traveling directions of the touch member 150-2 may be changed in accordance with the sliding directions S1 and S2 of the operated body 120C. Thus, the operation device can provide the operator with different tactile information based on the sliding directions.

Figure 22:
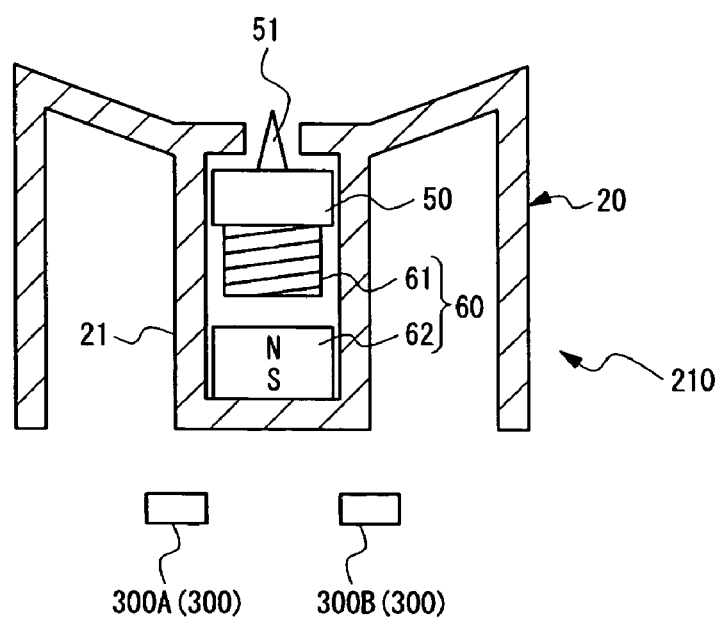
FIG. 22 is a cross-sectional view of a part of an operation device in accordance with a third embodiment of the present invention.
Figure 23A:
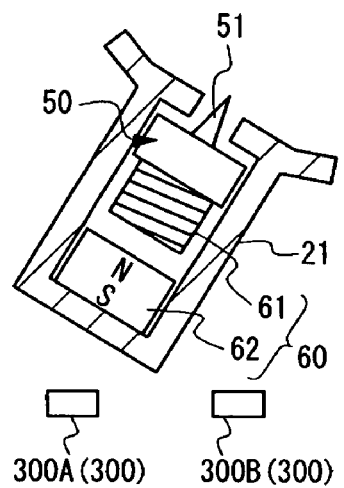
FIGS. 23A and 23B are cross-sectional views of operating states of the operation device shown in FIG. 22.
Figure 23B:
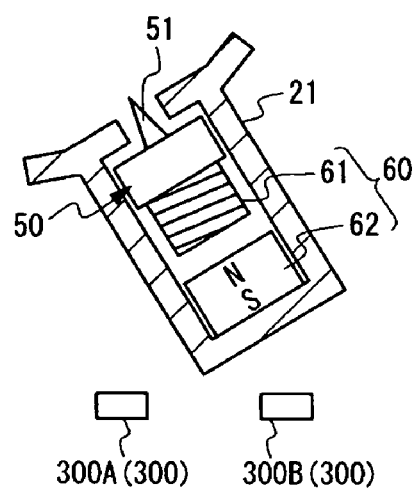
Figure 24:
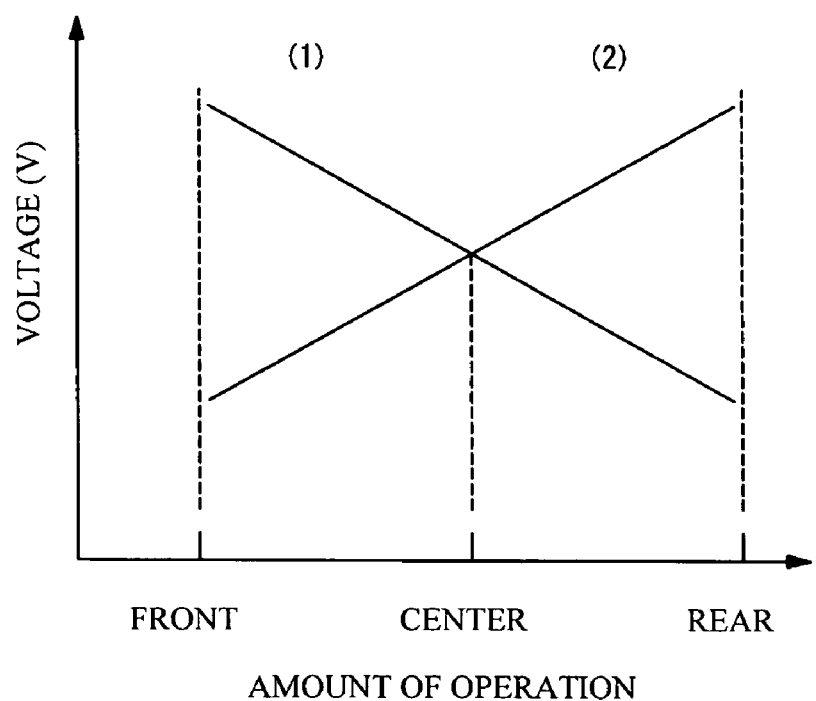
FIG. 24 is a graph of an output voltage of a detection element employed in the third embodiment.
Figure 25:
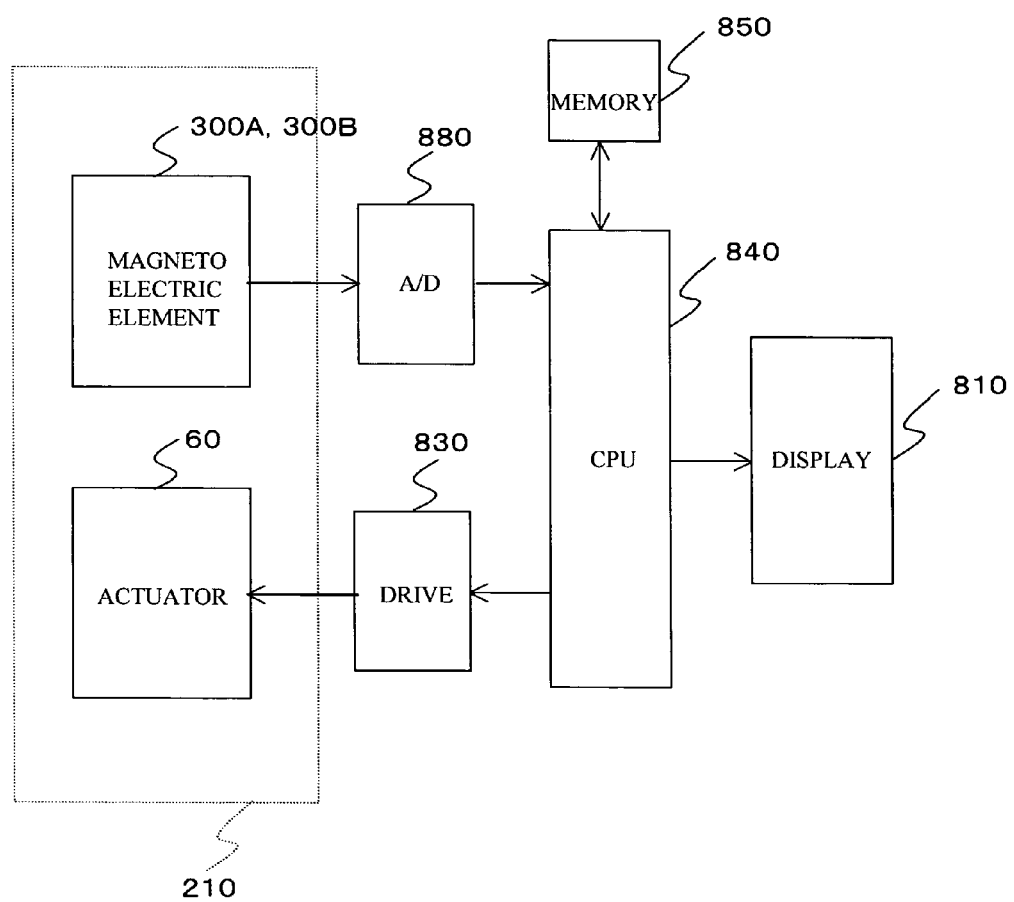
FIG. 25 is a block diagram of an electronic book device to which the operation device of the third embodiment is applied.

FIGS. 22 through 25 show an operation device in accordance with a third embodiment. More specifically, FIG. 22 is a cross-sectional view of a part of an operation device of the third embodiment. FIGS. 23A and 23B are cross-sectional views of operating states of the operation device, and FIG. 24 is a graph of an output voltage of a detection element. FIG. 25 is a block diagram of an electronic book device to which the present operation device is applied. In these figures, parts that are the same as those of the first embodiment are given the same reference numerals as previously.

An operation device 210 of the present embodiment is equipped with multiple magnetoelectric elements 300 functioning as detection elements. The operation device 210 illustrated in FIG. 22 has two magnetoelectric elements 300A and 300B, which are fixed to the casing 40 not shown therein. The magnetoelectric elements 300 are capable of detecting the degree of operation of the operated body 20 and identifying the operating direction of the operated body 20. In this regard, the magnetoelectric elements 300 form an operation signal producing means for producing an operation signal that represents the operation applied to the operated body 20.

The magnetoelectric elements 300A and 300B sense the magnetic flux of the magnet 62 of the actuator, and generates a voltage that depends on the magnitude of the magnetic flux.

More particularly, as shown in FIG. 23A, when the operated body 20 is inclined to cause the magnet 62 to be closer to the magnetoelectric element 300A, the output voltage of the magnetoelectric element 300A is increased while the output voltage of the magnetoelectric element 300B is decreased. In contrast, as shown in FIG. 23B, when the rotated body 20 is inclined to cause the magnet 62 to be closer to the magnetoelectric element 300B, the output voltage of the magnetoelectric element 300B is increased while the output voltage of the magnetoelectric element 300A is decreased. That is, as shown in FIG. 24, the output voltage of the magnetoelectric element 300A is changed as indicated by a graph (1), and the output voltage of the magnetoelectric element 300B is changed as indicated by a graph (2).

Referring to FIG. 25, the electronic book device equipped with the operation device 210 has an A/D converter 880, which converts the analog output signals of the magnetoelectric elements 300A and 300B into digital signals, which are then applied to the CPU 840.

The operation pattern of the actuator 60 is controlled in accordance with the amount of operation of the operated body 20. More particularly, when the operated body 20 is operated with a relatively small amount of operation, the actuator 60 is driven for a relatively short time. In contrast, when the operated body 20 is operated with a relatively large amount of operation, the actuator 60 is driven of a relatively long time. Thus, the operation device can present different tactile information to the operator in accordance with the amount of operation.

Another parameter may be controlled instead of the driving time. For example, the driving frequency or driving amount (amplitude) of the actuator 60 may be changed in accordance with the degree of operation on the operated body 20. The amount of operation on the operated body 20 may be associated with the number of pages flipped. For example, a small amount of pages is flipped for a small amount of operation on the operated body 20, and a large amount of pages is flipped for a large amount of operation thereon.

Figure 26:
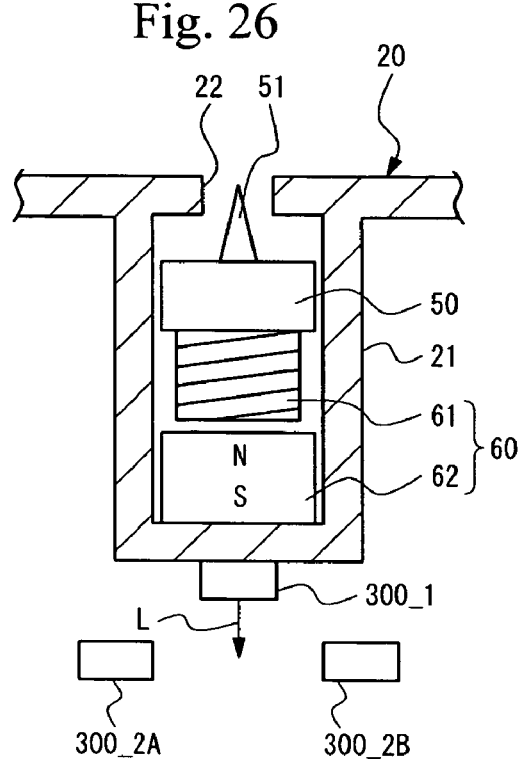
FIG. 26 is a cross-sectional view of a part of a variation of the operation device configured in the third embodiment.

FIG. 26 is a cross-sectional view of a part of a variation of the operation device configured in the third embodiment. In FIG. 26, parts that are the same as those of the first embodiment are given the same reference numerals. An operation device shown in FIG. 26 has a light-emitting element 300-1, and multiple light-receiving elements such as elements 300-2A and 300-2B. The light-emitting element 300-1 is provided to the lower end of the holding section 21 and emits a light L. The multiple light-emitting elements 300-2A and 300-2B are attached to the casing 40, which is not illustrated in FIG. 26. The light-receiving elements 300-2A and 300-2B converts the light emitted from the light-emitting element 300-1 into electrical signals, which are applied to the A/D converter 880. The amounts of light received by the light-receiving elements 300-2A and 300-2B depend on the amount of operation on the operated body 20. It is thus possible to detect the amount and direction of operation on the operated body 20.

Figure 27:
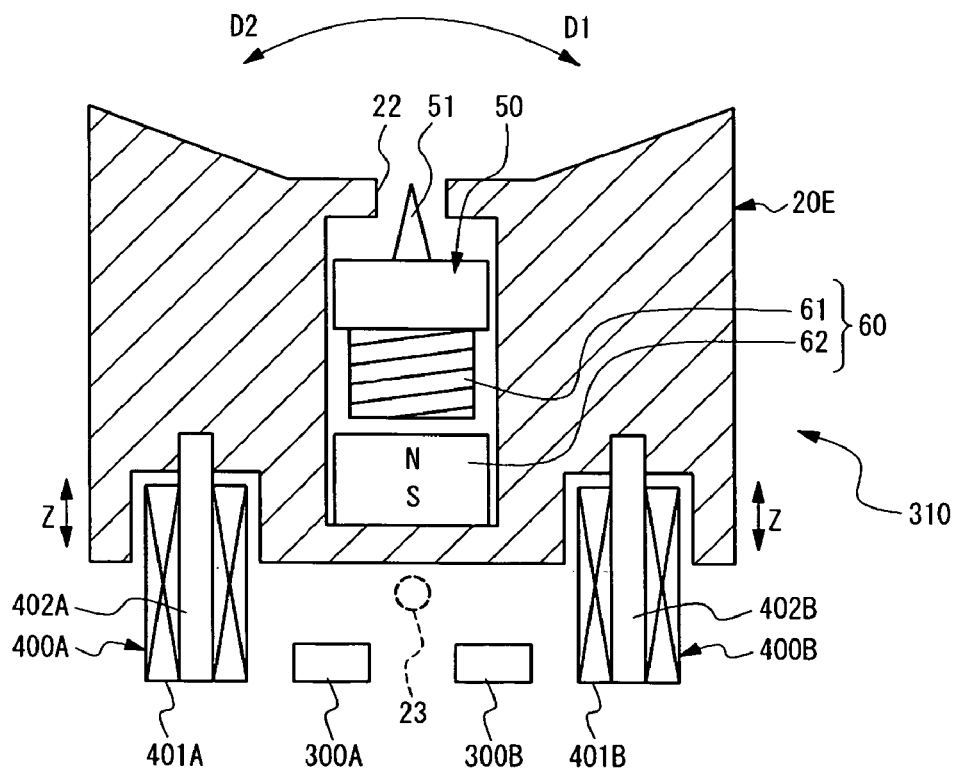
FIG. 27 is a cross-sectional view of an operation device in accordance with a fourth embodiment of the present invention.
Figure 28:
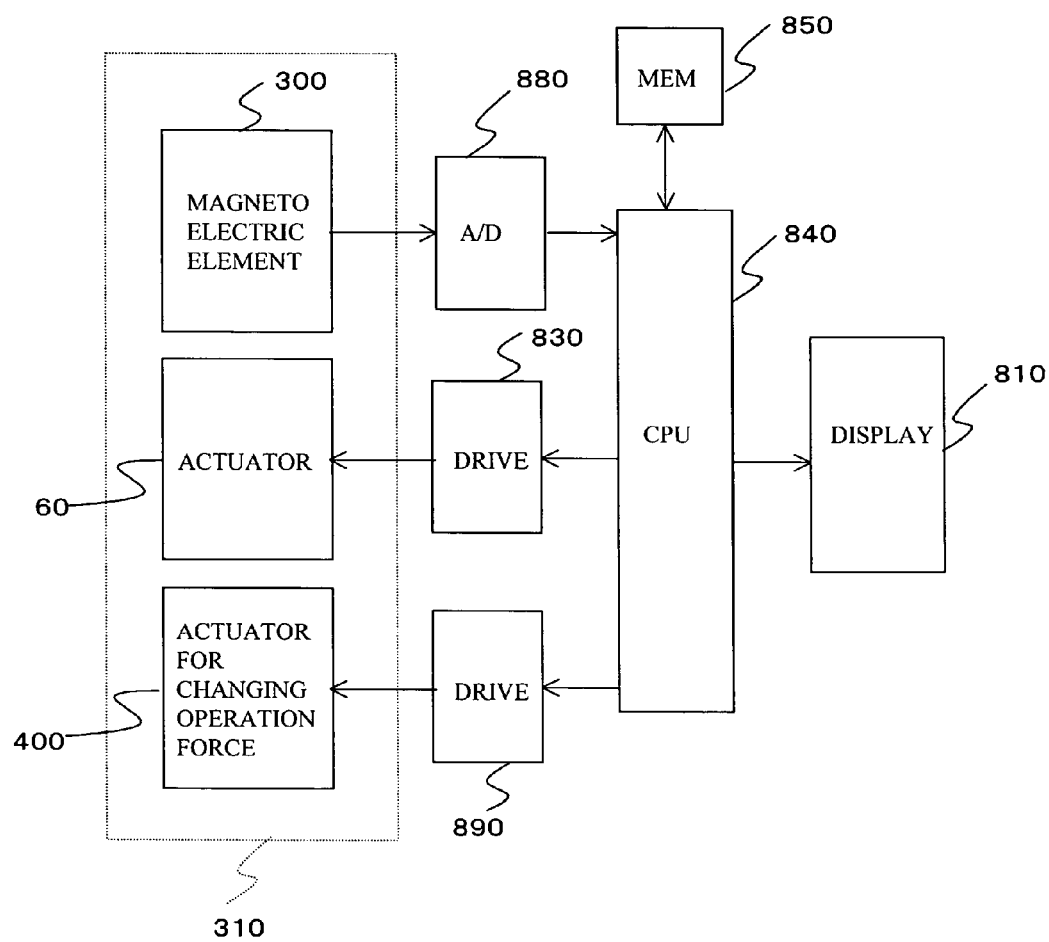
FIG. 28 is a block diagram of an electronic book device to which the operation device shown in FIG. 27 is applied.

FIGS. 27 and 28 show a fourth embodiment of the present invention, in which FIG. 27 is a cross-sectional view of an operation device and FIG. 28 is a block diagram of an electronic book device to which the operation device shown in FIG. 27 is applied. In FIGS. 27 and 28, parts that are the same as those of the third embodiment are given the same reference numerals.

An operation device 310 has two electromagnetic solenoid actuators 400A and 400B, which form an operation force changing actuator that alters force necessary to manually operate an operated body 20E. The solenoid actuators 400A and 400B generate forces opposite to the operating directions D1 and D2 of the operated body 20E. The solenoid actuators 400A and 400B are disposed between the casing 40 not shown and the operated body 20E, and are positioned so as to correspond to the operating directions (swing directions) of the operated body 20E. The solenoid actuators 400A and 400B are respectively equipped with solenoid coils 401A and 401B and movable iron cores 402A and 402B. When currents flow through the solenoid coils 401A and 401B, the movable iron cores 402A and 402B are moved in the directions Z.

Referring to FIG. 28, the electronic book device equipped with the operation device 310 has a drive circuit 890,which drives the electromagnetic solenoid actuators 400A and 400B.

When the operated body 20E is operated in the operating direction D1, the electromagnetic solenoid actuator 400B is driven to exert force opposite to the operating direction D1 on the operated body 20E. When the operated body 20E is operated in the operating direction D2, the electromagnetic solenoid actuator 400A is driven to exert force opposite to the operating direction D2 on the operated body 20E. The force necessary to manually operate the operated body 20E can be controlled (altered) by controlling the forces generated by the electromagnetic solenoid actuators 400A and 400B.

More specifically, the force of operation is controlled based on the amount of operation on the operated body 20E. For example, a large magnitude of force is set for a small amount of operation (a small number of pages flipped). As the amount of operation increases, a smaller magnitude of force is set. It is thus possible to provide the operator with information about the number of pages to be flipped in the form of the magnitude of force necessary to manually operate the operated body 20E.

Figure 29:
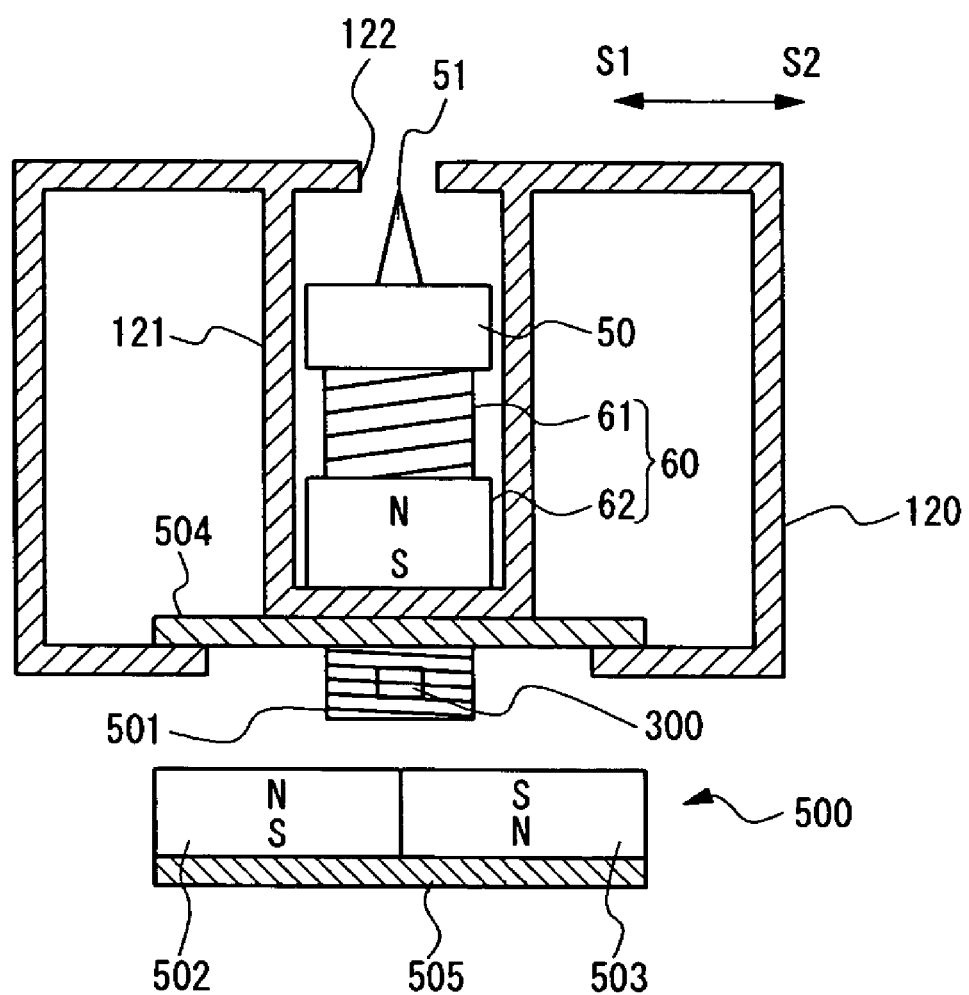
FIG. 29 is a cross-sectional view of a part of a variation of the operation device of the fourth embodiment.

FIG. 29 is a cross-sectional view of a part of a variation of the operation device of the fourth embodiment, in which parts that are the same as those of the second through fourth embodiments are given the same reference numerals. The second embodiment is the operation device equipped with the operated body supported so as to be free to swing. In contrast, the operation device shown in FIG. 29 has an operated body 120 supported so as to freely slide to which an operation force changing actuator is applied.

Referring to FIG. 29, an operation force changing actuator 500 has magnets 502 and 503, and a coil 501. The magnets 502 and 503 are arranged on a yoke 505 side by side in the sliding directions S1 and S2 and have magnetic poles arranged in opposite directions. A yoke 504 is fixed to the lower end of the holding section 121, and the coil 501 is fixed to the yoke 504 so as to face the magnets 502 and 503. The yokes 504 and 505 are used to form magnetic circuits. The magnetoelectric element 300 for detecting the position of the operated body in the sliding directions S1 and S2 is arranged on the yoke 504.

When current flows through the coil 501, electromagnetic forces are generated between the coil 501 and the magnets 502 and 503, and force opposite to the sliding direction S1 or S2, so that the force of manual operation on the operated body 120 can be controlled or changed.

The above embodiment uses the magetoelectric element 300 instead of the switch circuit 70. The magnetoelectric element 300 may be used instead of the switch circuit 170.

In the foregoing, the electronic book device is described as an exemplary electronic apparatus. The present invention is not limited to the above but includes various electronic equipment such as portable information terminal equipment.

The present invention is not limited to the specifically described embodiments, but includes other embodiments, variations and modifications within the scope of the claims.

The present invention is based on Japanese Patent Application No. 2005-226186, and the entire disclosure of which is hereby incorporated by reference.

What is claimed is:

1. An operation device comprising:
    an operated body swingably supported in a first direction and a second direction focusing on a swing axis;
    an operation signal producing part that produces an operation signal based on an operation on the operated body; and
    a tactile information presenting part that presents tactile information through the operated body,
    wherein the tactile information presenting part comprises a first touch member, a second touch member, a first driver, and a second driver,
    the first touch member and the second touch member being provided in the operated body,
    the first driver that drives the first touch member to protrude partially from a surface of the operated body through an opening formed in the operated body so as to bring the first touch member into contact with an object that operates the operated body when the operated body is swung in the first direction by the object, and
    the second driver that drives the second touch member to protrude partially from the surface of the operated body through an opening formed in the operated body so as to bring the second touch member into contact with the object when the operated body is swung in the second direction by the object.

2. The operation device as claimed in claim 1, wherein the first driver and the second driver comprise a piezoelectric element that drives the touch member that includes a film-like member.

3. The operation device as claimed in claim 1, wherein the first and the second touch member have a vibratory element that partially protrudes from the operated body.

4. The operation device as claimed in claim 1, wherein the operation signal producing part comprises a switch circuit that produces the operation signal based on the operation on the operated body.

5. The operation device as claimed in claim 1, wherein the operation signal producing part comprises a detection element that detects an amount of operation on the operated body.

6. The operation device as claimed in claim 1, wherein the operation signal producing part comprises multiple elements that detect a direction in which the operated body is operated.

7. The operation device as claimed in claim 1, wherein the operation signal producing part comprises a light-emitting element attached to the operated body, and a light-receiving element converting light emitted from the light-emitting element into an electric signal.

8. The operation device as claimed in claim 1, wherein the operation signal producing part comprises magnetoelectric elements that detect magnetic flux generated by a driver that drives a touch member of the tactile information presenting part, the touch member being touchable to an object that operates the operated body.

9. The operation device as claimed in claim 1, wherein:
the first and second drivers comprise an electromagnetic actuator having a coil and a magnet.

10. An operation device for use by an operator, comprising:
an operated body movable relative to a housing to slide in first and second directions;
an operation signal producing part that responds to the sliding movement of the operated body by presenting tactile information through the operated body; and
a rotatable touch member received in the operated body and having at least one protrusion permanently fixed to the touch member,
wherein the touch member is rotated by the operation signal producing part to cause the at least one protrusion to contact the operator, and
wherein a travelling direction of the touch member being changeable in accordance with a sliding direction of the operated body.

11. The operation device as claimed in claim 10, further comprising:
a motor for rotating the touch member in the first and second directions.

12. An electronic book device comprising:
a display;
a memory that stores book data to be displayed on the display;
an operation device instructing flipping of pages of the book data; and
a processor controlling the display, the memory and the operation device, the operation device including:
an operated body swingably supported in a first direction and a second direction focusing on a swing axis that is operated at the time of flipping of pages;
an operation signal producing part that produces an operation signal based on flipping of pages on the operated body; and
a tactile information presenting part that presents tactile information through the operated body, the tactile information being based on flipping of pages,
wherein the tactile information presenting part comprises a first touch member, a second touch member, a first driver, and a second driver,
the first touch member and the second touch member being provided in the operated body,
the first driver that drives the first touch member to protrude partially from a surface of the operated body through an opening formed in the operated body so as to bring the first touch member into contact with an object that operates the operated body when the operated body is swung in the first direction by the object, and
the second driver that drives the second touch member to protrude partially from the surface of the operated body through an opening formed in the operated body so as to bring the second touch member into contact with the object when the operated body is swung in the second direction by the object.

13. An electronic device comprising:
a processor; and
an operation device connected to the processor, the operation device including:
an operated body swingably supported in a first direction and a second direction focusing on a swing axis,
an operation signal producing part that produces an operation signal based on an operation on the operated body, the operation signal being sent to the processor; and
a tactile information presenting part that presents tactile information through the operated body under the control of the processor,
wherein the tactile information presenting part comprises a first touch member, a second touch member, a first driver, and a second driver,
the first touch member and the second touch member being provided in the operated body,
the first driver that drives the first touch member to protrude partially from a surface of the operated body through an opening formed in the operated body so as to bring the first touch member into contact with an object that operates the operated body when the operated body is swung in the first direction by the object, and
the second driver that drives the second touch member to protrude partially from the surface of the operated body through an opening formed in the operated body so as to bring the second touch member into contact with the object when the operated body is swung in the second direction by the object.

* * * * *